United States Patent
Pidishety et al.

(10) Patent No.: US 11,460,638 B2
(45) Date of Patent: Oct. 4, 2022

(54) FUSED FIBRE COUPLERS, AND APPARATUSES AND METHODS FOR THE MANUFACTURE AND USE THEREOF

(71) Applicants: University Of Southampton, Hampshire (GB); Indian Institute of Technology Madras (IIT Madras), Chennai (IN)

(72) Inventors: Shankar Pidishety, Hampshire (GB); Balaji Srinivasan, Hampshire (GB); Gilberto Brambilla, Hampshire (GB)

(73) Assignees: UNIVERSITY OF SOUTHAMPTON, Hampshire (GB); INDIAN INSTITUTE OF TECHNOLOGY MADRAS, Chennai (IN)

( * ) Notice: Subject to any disclaimer, the term of this patent is extended or adjusted under 35 U.S.C. 154(b) by 975 days.

(21) Appl. No.: 16/306,804

(22) PCT Filed: Jun. 3, 2016

(86) PCT No.: PCT/GB2016/051659
§ 371 (c)(1),
(2) Date: Dec. 3, 2018

(87) PCT Pub. No.: WO2017/207952
PCT Pub. Date: Dec. 7, 2017

(65) Prior Publication Data
US 2019/0137690 A1    May 9, 2019

(51) Int. Cl.
*G02B 6/28* (2006.01)
*G02B 6/27* (2006.01)
*H04B 10/50* (2013.01)

(52) U.S. Cl.
CPC ............. *G02B 6/2835* (2013.01); *G02B 6/27* (2013.01); *H04B 10/50* (2013.01)

(58) Field of Classification Search
CPC ......... G02B 6/2835; G02B 6/27; H04B 10/50
See application file for complete search history.

(56) References Cited

U.S. PATENT DOCUMENTS

| | | | | |
|---|---|---|---|---|
| 8,160,413 B2* | 4/2012 | Wu | ............ | G02B 6/2835 385/50 |
| 2004/0170358 A1* | 9/2004 | Ishii | ............ | G02B 6/2835 385/43 |
| 2006/0266743 A1* | 11/2006 | Chi | ............ | B23K 26/0665 219/121.68 |
| 2013/0222891 A1* | 8/2013 | Sayinc | ............ | G02B 6/2835 65/382 |
| 2019/0137690 A1* | 5/2019 | Pidishety | ............ | G02B 6/27 |

OTHER PUBLICATIONS

Generation and propagation of radially polarized beams in optical fibers, Ramachandran et al, Aug. 14, 2009, Optics Letters, Optical Society of America, vol. 34, No. 16, pp. 2525-2527 (Year: 2009).*

* cited by examiner

*Primary Examiner* — Tina M Wong

(57) ABSTRACT

A fused fibre coupler comprising: a single mode fibre, SMF, and an orbital angular momentum fibre, OAMF, the fibres having a coupling portion in which the fibres are longitudinally aligned side by side and fused at least over a coupling length in which the SMF and OAMF are tapered such that the diameter of the SMF and the diameter of the OAMF give the fibres matching effective refractive indices for a single mode of the SMF and an orbital angular momentum, OAM, mode of the OAMF for a coupled wavelength of light.

17 Claims, 5 Drawing Sheets

FUSED FIBRE COUPLERS, AND APPARATUSES AND METHODS FOR THE MANUFACTURE AND USE THEREOF

TECHNICAL FIELD

The embodiments herein generally relate to fused fibre couplers and more particularly but not exclusively to manufacturing fused fibre couplers and their use in determination of orbital angular momentum beam generation and mode multiplex switching. The present application is based on, and claims priority from international application number PCT/GB2016/051659 filed on Jun. 3, 2016, the disclosure of which is hereby incorporated by reference.

BACKGROUND

Optical beams with orbital angular momentum, OAM, such as illustrated in FIGS. 1A, 1B and 1C, are characterised by a helical phase front, $e^{il\phi}$ (1 & $\phi$ being topological charge and azimuthal angle, respectively). FIG. 1A illustrates a beam with orbital angular momentum travelling through the spatial domain. FIG. 1B illustrates a planar view of the phase of a beam with orbital angular momentum. FIG. 1C illustrates a planar view of the magnitude of a beam with orbital angular momentum.

OAM beams have gained much interest in recent years due to the potential for using OAM states as orthogonal signal channels for scaling the bandwidth of next-generation optical communication networks. OAM generation has been widely studied in free space (spiral phase plate, Q-plate and cylindrical lens), silicon and to a limited extent, in fibre. While a few of these devices offer scalability, i.e. ability to multiplex many OAM modes with low loss, none of them are directly fibre compatible.

SUMMARY

The application discloses, in embodiments, a fused fibre coupler comprising: a single mode fibre, SMF, and an orbital angular momentum fibre, OAMF, the fibres having a coupling portion in which the fibres are longitudinally aligned side by side and fused at least over a coupling length in which the SMF and OAMF are tapered such that the diameter of the SMF and the diameter of the OAMF give the fibres matching effective refractive indices for a single mode of the SMF and an orbital angular momentum, OAM, mode of the OAMF for a coupled wavelength of light. In embodiments, the OAMF is an air core fibre. In embodiments, the OAMF is solid core fibre. In embodiments, the effective refractive indices may be matched for a given wavelength of light from a light source to be coupled into or out of the orbital angular momentum fibre. In embodiments, the fibres may be weakly fused over at least the coupling length. In embodiments, the coupling length is a length over which light of the coupled wavelength couples into two orthogonally polarised hybrid modes of the OAMF □/2 out of phase, so as to couple the light into an orbital angular momentum, OAM, mode of the OAMF. In embodiments, the SMF and the OAMF have a tapered profile into the coupling length. In embodiments, the SMF may be configured to couple light of the coupling wavelength into or out of an OAM mode of the OAMF. In embodiments, the fused fibre coupler may comprise plural SMF fibres each arranged to couple light of the coupling wavelength into or out of an OAM mode of the OAMF. In embodiments, the fused fibre coupler may comprise plural SMF fibres each arranged to couple light of the coupling wavelength into a different OAM mode of the OAMF. In embodiments, the fused fibre coupler may comprise plural SMF fibres each arranged to couple light of the coupling wavelength out of a different OAM mode of the OAMF.

The application discloses, in embodiments, a photonic lantern comprising a fused fibre coupler in accordance with the aforementioned embodiments, comprising plural SMF fibres arranged to couple light of the coupling wavelength into and out of different OAM modes of the OAMF. In embodiments, the photonic lantern may comprise plural orbital angular momentum fibres merged in a fibre, and one or more SMF fibres arranged to couple light of the coupling wavelength into and out of OAM modes of one or more of the orbital angular momentum fibres of the OAMF.

The application discloses, in embodiments, apparatus for generating an orbital angular momentum, OAM, mode in an orbital angular momentum fibre, OAMF, comprising: a fused fibre coupler or a photonic lantern in accordance with the aforementioned embodiments; a light source configured to generate light of the coupling wavelength; and coupling means to couple light from the light source into an input SMF of the fused fibre coupler. In embodiments, the apparatus may further comprise a polarisation controller to control the polarisation of light from the light source in the input SMF to be linearly polarised having a linear polarisation in the coupling portion of the SMF at 45 degrees to a line intersecting the axes of the SMF and OAMF in the coupling region. In embodiments, the apparatus may further comprise plural light sources and plural input SMFs each arranged to couple light of the coupling wavelength into a different OAM mode of the OAMF.

The application discloses, in embodiments, a mode division multiplexer, MDM, comprising apparatus for generating an orbital angular momentum, OAM, mode in an orbital angular momentum fibre, OAMF, in accordance with the aforementioned embodiments; and a multiplexing means for controlling the light sources to encode signals therein, the MDM being arranged to multiplex plural encoded signals into light of different OAM modes of an OAMF.

The application discloses, in embodiments, use of a fused fibre coupler or a photonic lantern in accordance with the aforementioned embodiments, in any one of:

OAM beam generation for free space waveguiding;
Mode division multiplexing, MDM, for optical communication;
Optical tweezers used for cell sorting/manipulation in healthcare;
Power/energy scaling of lasers optionally used in one or more of material processing, healthcare, or defence;
As a seed of a master oscillator power/fibre amplifier;
Pump/probe discrimination and stray light discrimination in spectroscopy.

The application discloses, in embodiments, a kit of parts for use in the manufacture of a fused fibre coupler in accordance with the aforementioned embodiments, comprising: an orbital angular momentum fibre, OAMF; a pre-tapered single mode fibre, SMF, having a tapered section having a diameter such that the ratio of the diameter of the tapered section of the SMF to a diameter of the OAMF is equal to the ratio of the diameter of the SMF in a model of a coupling portion of the coupler to the diameter of the OAMF in the model of the coupling portion of the coupler that is modelled to give the fibres matching effective refractive indices for a single mode of the SMF and an orbital angular momentum, OAM, mode of the OAMF for a coupled wavelength of light; and a tapering rig for tapering the SMF and OAMF when affixed together longitudinally to fuse the SMF and OAMF and form the coupling portion. In embodiments, the kit of parts may further comprise the model of the coupling portion of the coupler, optionally embodied as data stored on one or more computer readable media. In embodiments, the tapering rig comprises: translational stages to be axially spaced and to hold the SMF and OAMF therebetween; a heat source in the form of a microheater, a flame, a resistive element, an induction element or an infrared laser for heating the SMF and OAMF; and a translational stage supporting the microheater for moving the microheater along the axis of the SMF and OAMF to taper the SMF and OAMF held under tension by flame brushing. In embodiments, the kit of parts may further comprise: a coherent light source configured to generate monochromatic light of the coupling wavelength; and a 3 dB fibre coupler to couple light from the coherent light source from a first output of the 3 dB coupler into an input of the SMF. In embodiments, the kit of parts may further comprise a polarisation controller to control the polarisation of light from the light source in the input SMF to be linearly polarised having a linear polarisation in the coupling portion of the SMF at 45 degrees to a line intersecting the axes of the SMF and OAMF in the coupling region. In embodiments, the kit of parts may further comprise: a beamsplitter to combine the light from the coherent light source output from a second output of the 3 dB coupler and light output from an output of the OAMF; and an imaging device to monitor the combined light of the second output of the 3 dB coupler and the output of the OAMF.

The application discloses, in embodiments, apparatus for use in the manufacture of a fused fibre coupler in accordance with the aforementioned embodiments, comprising: an orbital angular momentum fibre, OAMF; a pre-tapered single mode fibre, SMF, having a tapered section having a diameter such that the ratio of the diameter of the tapered section of the SMF to a diameter of the OAMF is equal to the ratio of the diameter of the SMF in a model of a coupling portion of the coupler to the diameter of the OAMF in the model of the coupling portion of the coupler that is modelled to give the fibres matching effective refractive indices for a single mode of the SMF and an orbital angular momentum, OAM, mode of the OAMF for a coupled wavelength of light, wherein a portion of the SMF is affixed to a portion of the OAMF longitudinally; and a tapering rig comprising: translational stages axially spaced and holding the affixed SMF and OAMF therebetween; heat source in the form of a microheater, a flame, a resistive element, an induction element or an infrared laser arranged to heat the SMF and OAMF; and a translational stage supporting the microheater and arranged moving the microheater along the axis of the SMF and OAMF to taper the SMF and OAMF held under tension by flame brushing over a coupling length. In embodiments, the apparatus may further comprise: a coherent light source configured to generate monochromatic light of the coupling wavelength; a 3 dB fibre coupler arranged to couple light from the coherent light source from a first output of the 3 dB coupler into an input of the SMF; a beamsplitter arranged combine light from the coherent light source output from a second output of the 3 dB coupler and light output from an output of the OAMF; and an imaging device arranged to monitor the combined light of the second output of the 3 dB coupler and the output of the OAMF. In embodiments, the apparatus may further comprise: a polarisation controller arranged to control the polarisation of light from the light source in the input SMF to be linearly polarised having a linear polarisation in the coupling portion of the SMF at 45 degrees to a line intersecting the axes of the SMF and OAMF in the coupling region.

The application discloses, in embodiments, a method of using apparatus for use in the manufacture of a fused fibre coupler in accordance with the aforementioned embodiments to manufacture a fused fibre coupler, comprising: flame brushing the affixed SMF and OAMF fibres over the coupling length while the translational stages hold the SMF and OAMF fibres to taper the SMF and OAMF fibres; monitoring the combined output of the SMF and the output of the OAMF; and stopping tapering the SMF and OAMF fibres based on the monitoring of the light output from at least the OAMF. In embodiments, wherein stopping tapering the SMF and OAMF fibres comprises: monitoring when the power of the light output from the OAMF, optionally in the OAM mode, is maximised; and/or monitoring the interference pattern of the combined light and validating that it indicates a coupling of light from the coherent light source into the OAM mode of the OAMF; and/or measuring a polarisation of the light output from the OAMF to validate that it is circularly polarised.

The application discloses, in embodiments, a method of fabricating a fused fibre coupler, comprising: fusing a coupling portion of a single mode fibre, SMF, and an orbital angular momentum fibre, OAMF, the diameter of the SMF and the diameter of the OAMF being such that the effective refractive indices of the fibres are matched for a single mode of the SMF and an orbital angular momentum, OAM, mode of the OAMF for a coupling wavelength of light. In embodiments, the OAMF is an air core fibre. In embodiments, the OAMF is a solid core fibre.

The application discloses, in embodiments, a method of fabricating a fused fibre coupler comprising: longitudinally aligning side by side: an orbital angular momentum fibre, OAMF; and a pre-tapered portion of a single mode fibre, SMF, having a tapered section having a diameter such that the ratio of the diameter of the tapered section of the SMF to a diameter of the OAMF is equal to the ratio of the diameter of the SMF in a model of the coupling portion of the coupler to the diameter of the OAMF in the model of the coupling portion of the coupler that is modelled to give the fibres matching effective refractive indices for a single mode of the SMF and an orbital angular momentum, OAM, mode of the OAMF for a coupled wavelength of light; optionally affixing the OAMF and the pre-tapered portion of the SMF to each other; and tapering the SMF and OAMF to fuse them together at least over a coupling length until the diameter of the SMF and the diameter of the OAMF in the coupling length give the fibres matching effective refractive indices for a single mode of the SMF and an orbital angular momentum, OAM, mode of the OAMF for the coupled wavelength of light. In embodiments, the OAMF is an air core fibre. In embodiments, the OAMF is a solid core fibre. In embodiments, the method may further comprise: modelling a coupling portion of the coupler by determining the effective refractive indices for a single mode of the SMF and an orbital angular momentum, OAM, mode of the OAMF for a wavelength of light to be coupled at different diameters of the SMF and OAMF to determine diameters of the SMF and OAMF at which the effective refractive indices are matched; determining a diameter ratio for the SMF to the OAMF in the modelled coupling portion of the coupler; pre-tapering a section of the SMF to a diameter such that the ratio of the diameter of the tapered section of the SMF to a diameter of the un-tapered OAMF is equal to the ratio of the diameter of the SMF in the model of the coupling portion of the coupler to the diameter of the OAMF in the model of the coupling portion of the coupler. In embodiments, the method may further comprise: tapering the SMF and the OAMF over the coupling length by heating the SMF and OAMF over the coupling length using a heat source in the form of a microheater, a flame, a resistive element, an induction element or an infrared laser while holding the SMF and OAMF under tension. In embodiments, the method may further comprise: modelling two orthogonally polarised supermodes of the coupled combined SMF and OAMF to determine a coupling length of the coupler by determining a length over which light of the coupled wavelength couples into two orthogonally polarised supermodes of the coupled combined SMF and OAMF, so as to couple the light into two hybrid modes $\Box/2$ out of phase in the OAMF resulting in an orbital angular momentum, OAM, mode of the OAMF. In embodiments, the axes of the two modelled orthogonally polarised supermodes of the coupled combined SMF and OAMF extend parallel to and orthogonal to a line connecting the cores of the coupled SMF and OAMF. In embodiments, the method may further comprise: inputting light from a coherent light source configured to generate monochromatic light of the coupling wavelength into an input of the SMF; combining light from the coherent light source and light output from an output of the OAMF; monitoring the combined light; and stopping tapering the SMF and OAMF based on the monitoring of the light output from at least the OAMF. In embodiments, the method may further comprise: controlling the polarisation of light from the light source in the input SMF to be linearly polarised having a linear polarisation in the coupling portion of the SMF at 45 degrees to a line intersecting the axes of the SMF and OAMF in the coupling region. In embodiments, stopping tapering the SMF and OAMF fibres may comprise: monitoring when the power of the light output from the OAMF, optionally in the OAM mode, is maximised; and/or monitoring the interference pattern of the combined light and validating that it indicates a coupling of light from the coherent light source into the OAM mode of the OAMF; and/or measuring a polarisation of the light output from the OAMF to validate that it is circularly polarised.

The application discloses, in embodiments, a method of using a fused fibre coupler or a photonic lantern in accordance with the aforementioned embodiments, comprising inputting light of the coupling wavelength into an input SMF of the fused fibre coupler and/or receiving light of the coupling wavelength out of an output SMF of the fused fibre coupler. In embodiments, the method may further comprise: controlling the polarisation of light in the input SMF to be linearly polarised having a linear polarisation in the coupling portion of the SMF at 45 degrees to a line intersecting the axes of the SMF and OAMF in the coupling region.

The application discloses, in embodiments, a fused fibre coupler comprising a fused single mode fibre and an orbital angular momentum fibre.

Hence, the present application discloses all-fibre based techniques for generating OAM modes in orbital angular momentum fibres, using fused SMF/OAMF fibre couplers, which offer the potential for direct integration with existing telecommunication and data communication infrastructures, and yet are mode-scalable, are highly desirable.

BRIEF DESCRIPTION OF THE DRAWINGS

Embodiments of the invention are further described hereinafter with reference to the accompanying drawings, in which.

DETAILED DESCRIPTION

Figure 1A:
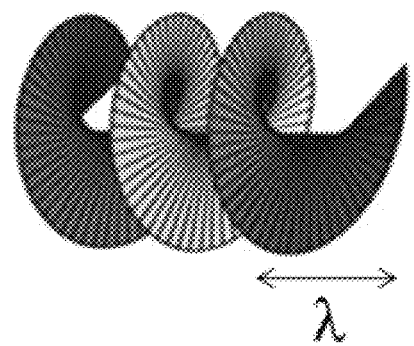
FIGS. 1A to 1C illustrate vortex beams with orbital angular momentum.
Figure 1B:
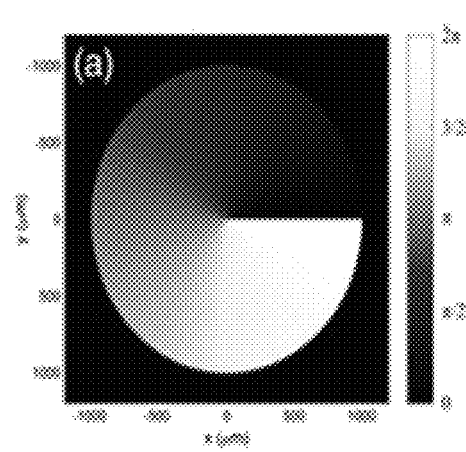
Figure 1C:
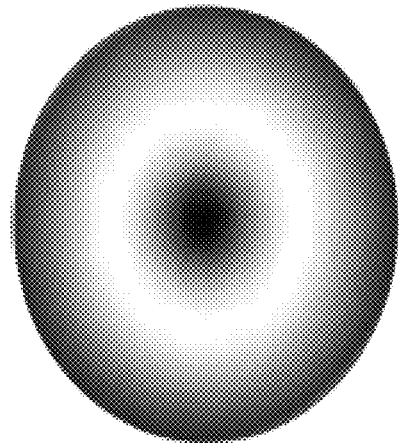
Figure 2A:
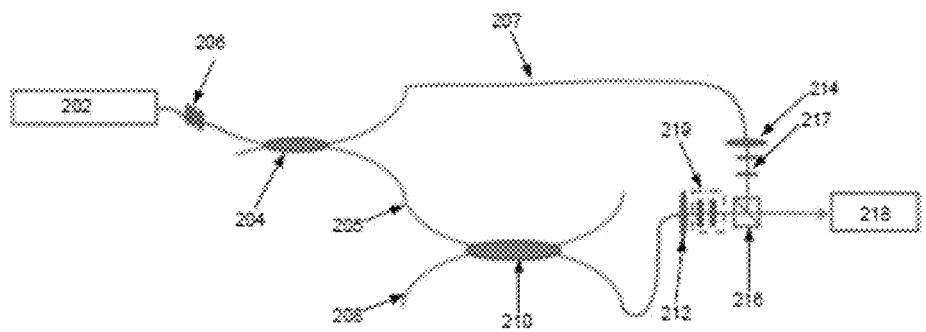
FIG. 2A is an illustration of a fused fibre coupler and apparatus for measuring characteristics of the fuse fibre coupler thereof.

A fused fibre coupler 210 in accordance with embodiments of the present disclosure, and apparatuses and methods for the design, manufacture, and testing/validation thereof will now be described. FIG. 2A schematically illustrates apparatus for use in testing and validating the coupling of light into an OAM mode of a fused fibre coupler in accordance with embodiments of the disclosure, usable, e.g. during a method of fabricating the fused fibre coupler 210.

Coherent, monochromatic light from a laser light source 202 passes through a polarisation controller 206 and is split into two arms 205 & 207 of equal amplitude using a 3 dB coupler 204. The polarisation controller 206 controls the polarisation of light from the light source 202 in the input single mode fibre, SMF, 205 to be linearly polarised having a linear polarisation in the coupling portion 228 of the SMF 205 at 45 degrees to a line intersecting the axes of the SMF 205 and OAMF 208 in the coupling region.

A first arm 205 output from the 3 dB coupler 204 is input into the input SMF of the fused fibre coupler 210 under test, in the example as it is being fabricated. A second arm 207 output from the 3 dB coupler 204 is used to construct an SMF-based reference arm passing light from the coherent laser light source 202 for later analysis and interrogation of the phase and polarisation of the beam output from the OAMF 208 of the fused fibre coupler 210 under test. The output beams from the reference SMF 205 and OAMF 208 are collimated using collimating lenses 212 and 214, polarised using wave plates 217, 219 and interfered using a free space beam splitter 216. The field patterns from the output of the beam splitter 216 are imaged using a CCD camera 218 or another suitable imaging device.

The arrangement of apparatus shown in FIG. 2A is usable to test the coupling into the OAM mode in the fused fibre coupler as it is being fabricated. However, use of the apparatus of FIG. 2A during manufacture is optional, and a manufacturing scheme for producing fused fibre couplers may be carried out without simultaneously performing the testing and validation of the OAM coupling using, for example, the apparatus as shown in FIG. 2A. Instead, if the manufacturing parameters and tolerances for producing a certain coupler may be designed and well-constrained using design and manufacturing processes disclosed herein, such that the manufacturing process is repeatable to reliably output couplers for coupling light into given OAM modes. By such a process, the fused fibre couplers 210 may be produced in larger volumes, e.g. in batches, in a more scalable manufacturing process, and testing may be performed mainly after manufacturing of, e.g. batches, of the couplers has been completed, as a quality control step. Nevertheless, in the embodiments described in detail herein, the apparatus of FIG. 2A is used to monitor the coupling of the light into the OAM mode during manufacturing to determine, as explained in more detail below, when to stop the tapering of the coupler.

Figure 2B:
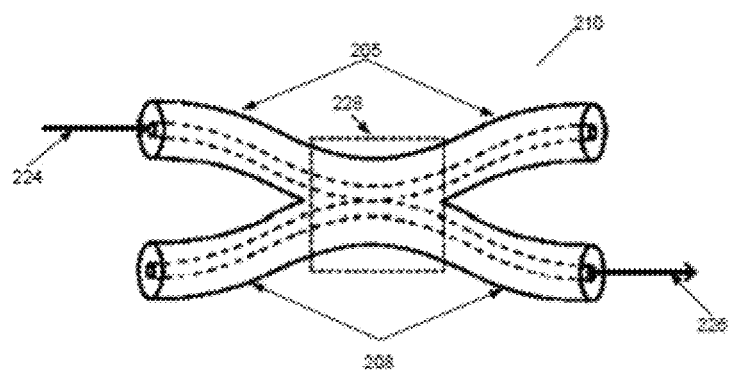
FIG. 2B is an illustration of a fused fibre coupler in operation.

FIG. 2B illustrates the fused fibre coupler 210 shown in the schematic in FIG. 2A in further detail. The SMF 205 is weakly fused to the OAMF 208 and forms a coupling portion 228 configured to allow a linearly polarised beam 224 travelling through the SMF 205 to excite in the OAMF 208 an OAM beam 226. In particular, the fibres 205, 208 are longitudinally aligned side by side in the coupling portion 228 and fused at least over a coupling length in which the SMF 205 and OAMF 208 are tapered (the tapering is not represented in FIG. 2B) such that the diameter of the SMF 205 and the diameter of the OAMF 208 in a coupling length thereof give the fibres 205, 208 matching effective refractive indices for a single mode of the SMF and an OAM mode of the OAMF for a coupled wavelength of light. The configuration of the coupling portion 228 may be in accordance with a model thereof, which, as will be explained in more detail below, has been created based on a determination of the effective refractive indices for a single mode of the SMF and an orbital angular momentum, OAM, mode of the OAMF for a wavelength of light to be coupled at different diameters of the SMF and OAMF and a determination of diameters of the SMF and OAMF at which the effective refractive indices are matched.

Figure 2C:
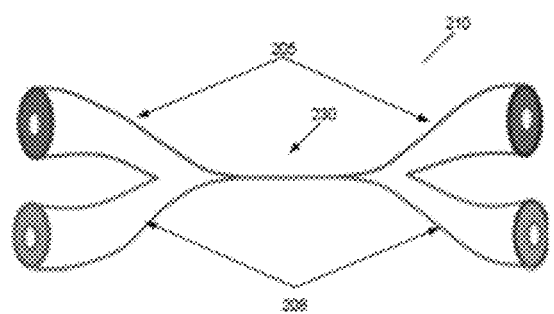
FIG. 2C is an illustration of a tapered section of a fused fibre coupler.

FIG. 2C illustrates a tapered section of the fused fibre coupler 210 of the schematic in FIG. 2B in further detail. In a coupling length of the tapered section, the diameters of the SMF and OAMF are such that such that the diameter of the SMF 205 and the diameter of the OAMF 208 in a coupling length thereof give the fibres 205, 208 matching effective refractive indices for a single mode of the SMF and an OAM mode of the OAMF for a coupled wavelength of light. Over at least the coupling length of the coupler 210, the fibres are weakly fused (i.e. they retain their circular cross sectional profiles and are weakly fused at their point of contact along their axes), wherein the coupling length is a length over which light of the coupled wavelength couples into two orthogonally polarised hybrid modes of the OAMF □/2 out of phase, so as to couple the light into an orbital angular momentum, OAM, mode of the OAMF.

The modelling of the coupling portion of the fused fibre coupler to determine the diameter of the fibres in the coupling portion, the necessary pre-tapered diameter of the SMF, and the coupling length to couple into an OAM mode of the OAMF, will now be described in more detail, with reference to FIG. 3.

Figure 3:
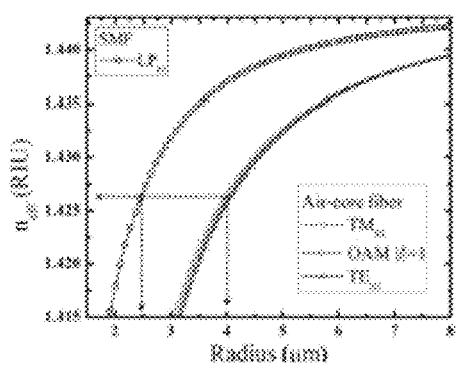
FIG. 3 is a plot of the relationship between the effective refractive index against the radius of a single mode fibre and an orbital angular momentum fibre at certain modes for the $LP_{01}$ mode of the single mode fibre and the $OAM(1)$, $TE_{01}$ and $TM_{01}$ modes of the orbital angular momentum fibre.

FIG. 3 is a plot of the relationship between the effective refractive index, $n_{eff}$ against the radius of a single mode fibre and an orbital angular momentum fibre at certain modes. The effective refractive index $n_{eff}$ of a fibre quantifies the phase delay per unit length in a waveguide, relative to the phase delay in a vacuum. In general, modes in OAMFs, in particular air core fibres, propagate with different effective refractive indices than the lowest order mode, $LP_{01}$, in SMF, due to the different fibre refractive index profiles. In the fused fibre coupler 210 to couple the light into the OAM mode, the $n_{eff}$ or propagation constants of the selected input mode in the input SMF and the coupled mode in the OAMF must be matched in order to achieve coupling, e.g. from $LP_{01}$ in SMF to any desired OAM mode in the OAMF. As all OAM modes, from the OAM $|1|=1$ mode to higher order OAM modes, HOMs, in the OAMF (particularly air core fibres) are associated with a lower $n_{eff}$ than for the $LP_{01}$ mode of the SMF, the diameter of the SMF generally needs to be reduced, e.g. by pre-tapering, to phase match the $LP_{01}$ mode therein with that of a selected OAM mode in the OAMF.

Referring to FIG. 3, the effective refractive index for the $LP_{01}$ mode in the SMF and the OAM $|1|=1$ mode in the air core OAMF are mapped as a function of fibre radius in order to calculate the fibre diameter ratio to achieve phase matching. This is because phase matching is achieved when the respective refractive indexes of the fibres is the same. When phase matching is achieved, the superposition of excited OAM $|1|=1$ modes is tuned by controlling input polarisation, with each circular polarisation exciting one specific OAM mode in its 2-mode degenerate subspace. In use, light from the light source in the input SMF is to be linearly polarised (e.g. using a polarisation controller) to have a linear polarisation in the coupling portion of the SMF at 45 degrees to a line intersecting the axes of the SMF and OAMF in the coupling region.

As can be seen from FIG. 3, to couple the $LP_{01}$ mode in the SMF and the OAM $|1|=1$ mode in the air core OAMF and achieve index matching, the OAMF can be tapered to a radius of around 4 microns, while the SMF must be tapered to a radius of around 2.5 microns.

In order to achieve these diameters in the fused fibre coupler, an OAMF and an SMF can be affixed longitudinally side by side and tapered, the OAMF and SMF having initial diameters in the ratio 4:2.5. This can be achieved by pre-tapering at least a section of the SMF to have a diameter corresponding to an initial diameter relative to the diameter of the un-tapered OAMF in accordance with the above ratio, to achieve effective refractive index matching on further tapering of the SMF and OAMF together.

The diameter to which the SMF is to be pre-tapered depends on the diameter of the initial, un-tapered diameter of the OAMF. As mass is conserved when the two fibres are affixed longitudinally side by side and tapered together such that their radii will reduce in proportion, the SMF needs to be pre-tapered to a diameter such that the ratio of the diameter of the tapered section of the SMF to a diameter of the un-tapered OAMF is equal to the ratio of the diameter of the SMF in the model of the coupling portion of the coupler to the diameter of the OAMF in the model of the coupling portion of the coupler.

To determine the coupling length, the coupling, or beat, length to couple the $LP_{01}$ mode in the SMF into the OAM mode of the OAMF is obtained from the propagation constants of the coupler supermodes through a 3 step process.

Firstly, the difference in the $n_{eff}$ of the even and odd supermodes ($n_{eff\,even}$ and $n_{eff\,odd}$) will provide the coupling length $L_B$ using:

$$L_B = \frac{\lambda}{n_{eff\,even} - n_{eff\,odd}}$$

The same process is performed for the two orthogonal polarisations, providing $L_B^{\parallel}$ and $L_B^{\perp}$ for the polarisation parallel and orthogonal to the line connecting the two fibre cores.

Both two orthogonal polarisations need to be coupled simultaneously into the OAM fibre, therefore a length L that it is simultaneously a multiple of $L_B^{\parallel}$ and $L_B^{\perp}$ a needs to be used.

The two polarisations need to be $\square/2$ out of phase, thus L needs to be such that provides a $\square/2$ shift between the two sets of polarisations. Each polarization experiences a $2\square$ phase change every $\square\square/n_{\it eff}$, or a phase change $\square$ over a length L:

$$\varphi = \frac{2\pi n_{\it eff}}{\beta\lambda}L$$

The phase difference between the different polarisations is thus given by:

$$\Delta\varphi = \frac{2\pi L}{\lambda}\left(\frac{n_{\it eff}}{\beta^{\parallel}} - \frac{n_{\it eff}}{\beta^{\perp}}\right)$$

Where $$\beta^{\parallel} = \frac{2\pi n_{\it eff}^{\parallel}}{\lambda} \text{ and } \beta^{\perp} = \frac{2\pi n_{\it eff}^{\perp}}{\lambda}$$

are the propagation constants of the two orthogonal polarisations of the tapered OAM fibre.

All $n_{\it eff}$ can be obtained from COMSOL Multiphysics® simulations for specific geometries and refractive index profiles.

Figure 4A:
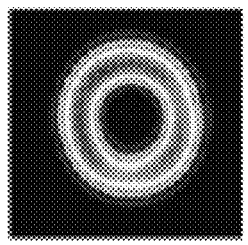
FIGS. 4A to 4C illustrate various far field images of the light output from the orbital angular momentum fibre, optionally interfered with light output from the 3 dB coupler.
Figure 4B:
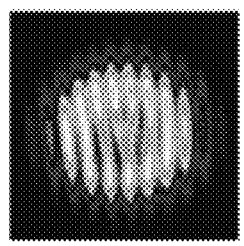
Figure 4C:
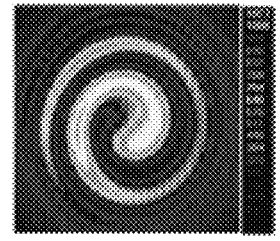

FIGS. 4A to 4C illustrate various far field images of the orbital angular momentum fibre of a fused fibre coupler 410, designed and manufactured as described in relation to FIGS. 2, 3, 5 and 6, the images 4A to 4C being generated using the apparatus of FIG. 2. FIG. 4A shows a clear doughnut pattern out of the OAMF output when the reference arm is blocked. The absence of $LP_{11}$ mode like patterns and a relatively uniform azimuthal intensity distribution shows that phase matched coupling to the OAM modes is achieved without substantial coupling to the neighbouring $HE_{11}$, $TE_{01}$ or $TM_{01}$ modes. A polarisation measurement performed using a polariser and quarter wave plate combination reveals that this beam is uniformly circularly polarised, further showing that these beams are OAM eigenmodes of the OAMF.

FIG. 4B illustrates when the reference arm un-blocked but incident on the camera at a slight angle with respect to the beam from the OAMF, the input polarisation is adjusted until the characteristic fork interference pattern is observed.

FIG. 4C illustrates when the beam from the reference arm co-aligned with that from the OAMF, the spiral interference between an OAM and an expanded Gaussian beam is observed. These outputs are indicative of coupling into the desired OAM mode.

Figure 5:
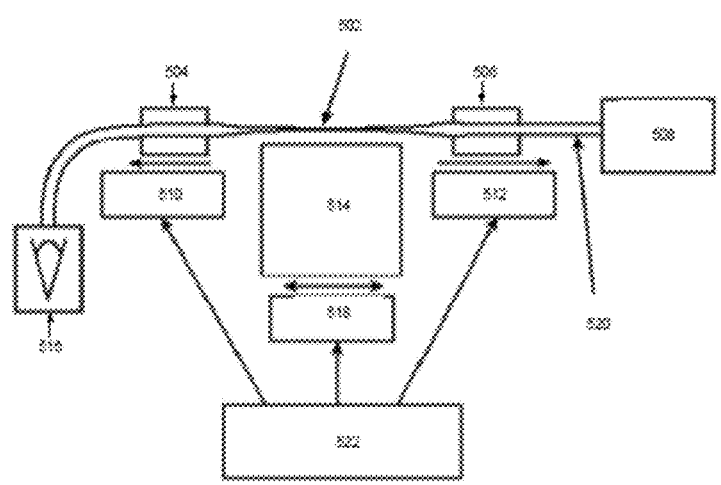
FIG. 5 illustrates an apparatus for the modified flame brushing technique.

FIG. 5 illustrates the modified flame brushing technique which is a method for manufacturing tapers and couplers. In this technique a microheater 514 acts as a point source heating only a very small section of at least one fibre fixed at its extremities to two translational stages 510 and 512. The microheater 514 travels in an oscillatory way on a microheater translational stage 518, while the translational stages 510 and 512 move apart. For the mass conservation, the diameter in the heated region 502 of the fibre(s) decreases and by controlling the stages 510 and 512 and the microheater movements it is possible to achieve a specific taper profile. Motor controller 522 is coupled to translational stages to 510, 512 and 518 in order to achieve the profile. A light source 508 is coupled to the at least one fibre 520 which allows the photodetector 516 to monitor the effect of tapering on the light source 508.

Figure 6:
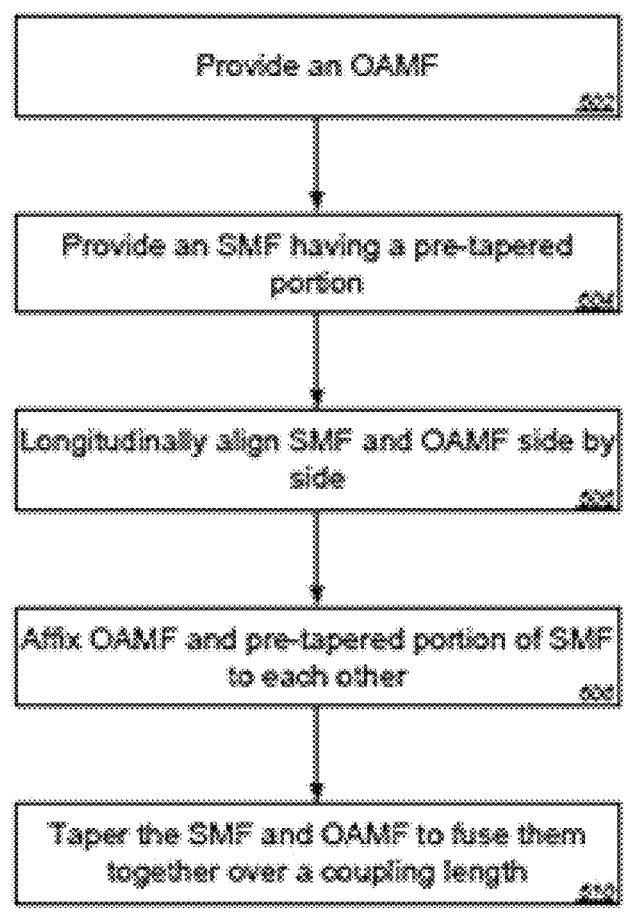
FIG. 6 illustrates the method of fabrication of a fused fibre coupler.

FIG. 6 illustrates a method of fabrication of a fused fibre coupler. In step 602, an OAMF is provided. In step 604, a pre-tapered portion of a SMF, is provided having a tapered section having a diameter such that the ratio of the diameter of the tapered section of the SMF to a diameter of the OAMF is equal to the ratio of the diameter of the SMF in a model of the coupling portion of the coupler to the diameter of the OAMF in the model of the coupling portion of the coupler that is modelled to give the fibres matching effective refractive indices for a single mode of the SMF and an OAM mode of the OAMF for a coupled wavelength of light. In step 606, the pre-tapered portion of the SMF and OAMF are longitudinally aligned. In step 608, the OAMF and the pre-tapered portion of the SMF are affixed to each other. Finally, in step 610, the SMF and OAMF are tapered together using the tapering rig of FIG. 5 to weakly fuse them and taper them to create the coupler by moving the microheater in an oscillatory manner to heat the fibres over a length corresponding to the modelled coupling length until the diameter of the SMF and the diameter of the OAMF in the coupling length give the fibres matching effective refractive indices for the modelled single mode of the SMF and the modelled OAM mode of the OAMF for the coupled wavelength of light. The tapering may be controlled to ensure that the coupling portion is configured to couple the desired wavelength into the OAM mode of the OAMF using the apparatus described in relation to FIG. 2A by monitoring the combined output of the SMF and the output of the OAMF using the camera 218, and operating the tapering rig to stop tapering the SMF and OAMF fibres based on the monitoring of the light output from at least the OAMF. Determining when to stop tapering the SMF and OAMF fibres may be based on:

monitoring when the power of the light output from the OAMF, optionally in the OAM mode, is maximised; and/or monitoring the interference pattern of the combined light and validating that it indicates a coupling of light from the coherent light source into the OAM mode of the OAMF; and/or measuring a polarisation of the light output from the OAMF to validate that it is circularly polarised.

At this point, once the tapering is stopped, the diameters of the SMF and OAMF should correspond to the modelled diameters to achieve coupling, and the fused fibre coupler is usable to couple OAM modes into OAMFs, including air core fibres, using SMFs.

Using the methods and apparatuses described herein, fused fibre couplers can be fabricated wherein the SMF is configured to couple light of the coupling wavelength into or out of an OAM mode of the OAMF. Plural SMF fibres can be provided, each arranged to couple light of the coupling wavelength into or out of an OAM mode of the OAMF. Also, plural SMF fibres can be provided each arranged to couple light of the coupling wavelength into a different OAM mode of the OAMF. Plural SMF fibres can also be provided, each arranged to couple light of the coupling wavelength out of a different OAM mode of the OAMF. In this way, fused fibre couplers can be designed and fabricated having one or more inputs and outputs for coupling light into and out of one or more OAM modes in in an OAMF. Such fused fibre couplers can have a range of uses in conjunction with apparatus including light sources, detectors, etc.

For example, a photonic lantern may be fabricated comprising a fused fibre coupler, comprising plural SMF fibres arranged to couple light of the coupling wavelength into and out of different OAM modes of the OAMF. The photonic lantern may be fabricated to have plural air or solid cores merged in a fibre, and one or more SMF fibres arranged to couple light of the coupling wavelength into and out of OAM modes of one or more of the air or solid cores of the OAMF.

A mode division multiplexer, MDM, may be fabricated comprising a fused fibre coupler, a light source configured to generate light of the coupling wavelength, and coupling means to couple light from the light source into an input SMF of the fused fibre coupler. A multiplexing means can be provided for controlling the light sources to encode signals therein, the MDM being arranged to multiplex plural encoded signals into light of different OAM modes of an OAMF.

Other uses of the fused fibre couplers include:
OAM beam generation for free space waveguiding;
Mode division multiplexing, MDM, for optical communication;
Optical tweezers used for cell sorting/manipulation in healthcare;
Power/energy scaling of lasers optionally used in one or more of material processing, healthcare, or defence;
As a seed of a master oscillator power/fibre amplifier;
Pump/probe discrimination and stray light discrimination in spectroscopy.

Features, integers and characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A fused fibre coupler comprising:
a plurality of single mode fibres (SMF) and an orbital angular momentum fibre (OAMF) the fibres having a coupling portion in which the fibres are longitudinally aligned side by side and fused at least over a coupling length in which the plurality of SMF and the OAMF are tapered such that the diameter of each of the plurality of SMF and the diameter of the OAMF give the fibres matching effective refractive indices for a single mode of the plurality of SMF and an orbital angular momentum (OAM) mode of the OAMF for a coupled wavelength of light.

2. The fused fibre coupler as claimed in claim 1, wherein the OAMF is an air core fibre.

3. The fused fibre coupler as claimed in claim 1, wherein the OAMF is a solid core fibre.

4. The fused fibre coupler as claimed in claim 1, wherein the effective refractive indices of the modes propagating in the OAMF and the plurality of SMF are matched for a given wavelength of light from a light source to be coupled into or out of the OAMF.

5. The fused fibre coupler of claim 1, wherein the fibres are weakly fused over the coupling length.

6. The fused fibre coupler of claim 1, wherein the coupling length is a length over which light of the coupled wavelength couples into two orthogonally polarised hybrid modes of the OAMF $\pi/2$ out of phase, so as to couple the light into an orbital angular momentum, OAM, mode of the OAMF.

7. The fused fibre coupler of claim 1, wherein the plurality of SMF and the OAMF have a tapered profile into the coupling length.

8. The fused fibre coupler of claim 1, wherein the plurality of SMF is configured to couple light of the coupling wavelength into or out of an OAM mode of the OAMF.

9. The fused fibre coupler of claim 1, comprising each of the plurality of SMF being arranged to couple light of the coupling wavelength into or out of an OAM mode of the OAMF.

10. The fused fibre coupler of claim 1, comprising each of the plurality of SMF arranged to couple light of the coupling wavelength into a different OAM mode of the OAMF.

11. The fused fibre coupler of claim 1, comprising each of the plurality of SMF arranged to couple light of the coupling wavelength out of a different OAM mode of the OAMF.

12. An apparatus for generating an orbital angular momentum (OAM) mode in an orbital angular momentum fibre (OAMF) comprising:
a fused fibre coupler further comprising a plurality of single mode fibres (SMF) and an orbital angular momentum fibre (OAMF), the fibres having a coupling portion in which the fibres are longitudinally aligned side by side and fused at least over a coupling length in which the plurality of SMF and the OAMF are tapered such that the diameter of each of the plurality of SMF and the diameter of the OAMF give the fibres matching effective refractive indices for a single mode of the plurality of SMF and an orbital angular momentum (OAM) mode of the OAMF for a coupled wavelength of light, wherein the plurality of SMF is arranged to couple light of the coupling wavelength into and out of different OAM modes of the OAMF;
a light source configured to generate light of the coupling wavelength; and
coupling means to couple light from the light source into an input SMF of the fused fibre coupler.

13. The apparatus as claimed in claim 12, further comprising a polarisation controller to control the polarisation of light from the light source in the input SMF to be linearly polarised having a linear polarisation in the coupling portion of the SMF at 45 degrees to a line intersecting the axes of the SMF and OAMF in the coupling region.

14. The apparatus as claimed in claim 12, further comprising plural light sources and plural input SMFs each arranged to couple light of the coupling wavelength into a different OAM mode of the OAMF.

15. A mode division multiplexer, MDM, comprising:
a fused fibre coupler further comprising a plurality of single mode fibres (SMF) and an orbital angular momentum fibre (OAMF), the fibres having a coupling portion in which the fibres are longitudinally aligned side by side and fused at least over a coupling length in which the plurality of SMF and the OAMF are tapered such that the diameter of each of the plurality of SMF and the diameter of the OAMF give the fibres matching effective refractive indices for a single mode of the plurality of SMF and an orbital angular momentum (OAM) mode of the OAMF for a coupled wavelength of light, wherein the plurality of SMF is arranged to couple light of the coupling wavelength into and out of different OAM modes of the OAMF;

a light source configured to generate light of the coupling wavelength;

coupling means to couple light from the light source into an input SMF of the fused fibre coupler;

a polarisation controller to control the polarisation of light from the light source in the input SMF to be linearly polarised having a linear polarisation in the coupling portion of the SMF at 45 degrees to a line intersecting the axes of the SMF and OAMF in the coupling region;

plural light sources and plural input SMFs each arranged to couple light of the coupling wavelength into a different OAM mode of the OAMF; and a multiplexing means for controlling the light sources to encode signals therein, the MDM being arranged to multiplex plural encoded signals into light of different OAM modes of an OAMF.

16. The fused fibre coupler as claimed in claim 1, wherein the OAMF is an air core fibre.

17. The fused fibre coupler as claimed in claim 1, wherein the OAMF is a solid core fibre.

\* \* \* \* \*